United States Patent
Gsteu

(10) Patent No.: US 6,609,697 B2
(45) Date of Patent: Aug. 26, 2003

(54) VACUUM CONTROL VALVE

(76) Inventor: Robert Andreas Gsteu, Baptist-Beck-Weg 3, A-6807 Tisis (AT)

( * ) Notice: Subject to any disclaimer, the term of this patent is extended or adjusted under 35 U.S.C. 154(b) by 6 days.

(21) Appl. No.: 09/947,882

(22) Filed: Sep. 6, 2001

(65) Prior Publication Data

US 2003/0042449 A1 Mar. 6, 2003

(51) Int. Cl.[7] .................................................. F16K 1/54
(52) U.S. Cl. ...................................... 251/121; 137/625.3
(58) Field of Search ................................ 251/120, 121, 251/122, 332; 137/625.3

(56) References Cited

U.S. PATENT DOCUMENTS

| | | | | |
|---|---|---|---|---|
| 2,014,314 A | * | 9/1935 | Defenbaugh | 251/122 |
| 2,117,182 A | * | 5/1938 | Lewis | 137/625.3 |
| 2,541,176 A | * | 2/1951 | Rockwell | 137/625.3 |
| 3,033,323 A | * | 5/1962 | Manna | 251/121 X |
| 3,108,780 A | * | 10/1963 | Wishart | 251/334 |
| 3,198,479 A | * | 8/1965 | Greenwood | 251/121 |
| 3,365,166 A | * | 1/1968 | Smith | 251/121 |
| 4,795,131 A | * | 1/1989 | Scarano et al. | 251/63 |
| 4,909,477 A | * | 3/1990 | Heiman | 251/284 |
| 4,938,376 A | * | 7/1990 | Fieseler et al. | 251/332 X |
| 4,976,404 A | * | 12/1990 | Ichikawa et al. | 251/121 |
| 5,156,188 A | * | 10/1992 | Wakita et al. | 137/625.3 |
| 5,163,476 A | * | 11/1992 | Wessman | 137/625.3 |
| 5,370,357 A | * | 12/1994 | Jones | 251/122 |
| 5,544,855 A | * | 8/1996 | Henken et al. | 251/121 |

FOREIGN PATENT DOCUMENTS

DE 4023845 C1 * 4/1992 ........... F16K/51/02

* cited by examiner

*Primary Examiner*—Ehud Gartenberg
*Assistant Examiner*—Eric Keasel
(74) *Attorney, Agent, or Firm*—Reed Smith LLP

(57) ABSTRACT

A vacuum control valve comprises a valve chamber with a valve opening which has a portion with a cylindrical inside wall on which an elastic sealing washer is provided. A closing body is included which comprises a cylindrical portion with a first end and a second end, adjoined by a portion of the closing body that widens into a cone, wherein at least one groove is present in the cylindrical portion of the closing body which extends to the first end of the cylindrical portion and which either widens along its extent to the first end, or deepens, or widens as well as deepens. An operating device is also included for the closing body which comprises a valve rod to which the closing body is attached and a drive device, wherein the closing body can be moved by means of the operating device, from a completely open position of the valve where the closing body has been pulled out of the elastic sealing washer, through a control range where the sealing washer encloses the cylindrical portion of the closing body, to a completely closed position where the portion of the closing body that widens into a cone is pressed against the sealing washer.

8 Claims, 3 Drawing Sheets

VACUUM CONTROL VALVE

BACKGROUND OF THE INVENTION a) Field of the Invention

The invention is directed to a vacuum control valve. More specifically, the invention is directed to a vacuum control valve with a controllable opening cross-section, comprising a valve chamber with a valve opening and a closing body, wherein an operating device for the closing body is provided which comprises a valve rod to which the closing body is affixed and a drive device, and the opening cross-section of the valve is controllable by changing the position of the closing body by means of the operating device.

b) Description of Related Art

Vacuum valves in the shape of a corner valve whose valve chamber has connection flanges arranged at an angle to each other are known. To close the valve, a valve gate arranged on a valve rod is placed against a valve seat in the valve chamber. The valve rod leaves the valve chamber via a feedthrough situated opposite to the valve seat. Such vacuum corner valves are, for example, known from DE 40 23 845 C1 and the U.S. Pat. No. 3,108,780.

Construction of such corner valves as control valves is furthermore known. For controlling the conductance of the valve, the closing body realized as a valve disk is lifted away from the valve seat in a controlled manner, but this only permits a very rough control of the opening cross-section. For a better control of small conductances, providing an opening in the valve disk which in the closed state of the valve is closed by another, smaller valve disk has already been suggested. Lifting the smaller valve disk away from the opening in the big valve disk can be controlled. To improve control behavior, the smaller valve disk could have a conical portion that protrudes into the opening in the big valve disk. Apart from the relatively complicated construction, such a control valve has the disadvantage that for small conductances, the production tolerances of the smaller valve disk, the sealing washer, and the valve seat of the small valve disk strongly influence control behavior.

A combined quick-acting gate valve and control valve intended in particular for the use in steam turbines is known from DE 30 18 093 A1. The control valve has a valve-closing piston that is arranged in a circular cylindrical area of the valve opening so that it can be moved. This closing piston has a ring-shaped flow-conducting channel with an approximately radial inlet and an approximately axial outlet. If the valve-closing piston only plunges into the cylindrical area of the valve opening to the start of the ring-shaped flow-conducting channel, the entire inlet cross-section of the flow-conducting channel is available. To control the flow of steam, the valve-closing piston is plunged in further so that the inlet of the flow-conducting channel is to a lesser or greater degree. A valve-closing cone is connected to the valve-closing piston. In the completely closed position of the valve, the valve closing cone lies in contact with the cone seat adjacent to the cylindrical portion of the valve opening; by means of this, the steam flow through the valve is completely cut off. This valve is not a vacuum valve and the maximal cross-section of the opening of the valve is determined by the opening cross-section of the flow-conducting channel.

From DE-PS 160 700 a control valve for feeding steam radiators is known which has flow controlling openings in the closing part.

Valves with closing parts whose shape widens into a cone are known in different embodiment forms. An embodiment example of such a valve is, for example, shown in U.S. Pat. No. 4,909,477.

OBJECT AND SUMMARY OF THE INVENTION

It is an important object of the invention to provide a vacuum control valve that makes precise control of small conductances possible.

It is a further object of the invention to provide a vacuum control valve that has a large control range.

It is a further object of the invention to provide a vacuum control valve that is vacuum-tight in its closed state.

It is a further object of the invention to provide a vacuum control valve that is of a simple construction and that can be produced in a simple and cost-effective manner because of its insensitivity to production tolerances.

A vacuum control valve according to the invention comprises:

a valve chamber with a valve opening which has a portion with a cylindrical inside wall on which an elastic sealing washer is provided;

a closing body which comprises a cylindrical portion with a first end and a second end adjoined by a portion of the closing body that widens into a cone, wherein at least one groove is present in the cylindrical portion of the closing body which extends to the first end of the cylindrical portion and which either widens along its extent to the first end, or deepens, or widens as well as deepens;

an operating device for the closing body which comprises a valve rod to which the closing body is attached and a drive device, wherein the closing body can be moved by means of the operating device, from a completely open position of the valve where the closing body has been pulled out of the elastic sealing washer, through a control range where the sealing washer encloses the cylindrical portion of the closing body, to a completely closed position where the portion of the closing body that widens into a cone is pressed against the sealing washer.

In an advantageous embodiment form of the invention, a portion of the closing body that narrows conically to form an insertion chamfer for the protection of the sealing washer adjoins the first end of the cylindrical portion.

Furthermore, in a preferred embodiment form of the invention, the groove has a starting point that lies at a distance from the second end of the cylindrical portion.

Further advantages and details of the invention are subsequently to be explained using the embodiment example shown in the drawings from which further objects of the invention also emerge.

DESCRIPTION OF THE PREFERRED EMBODIMENTS

Figure 1:
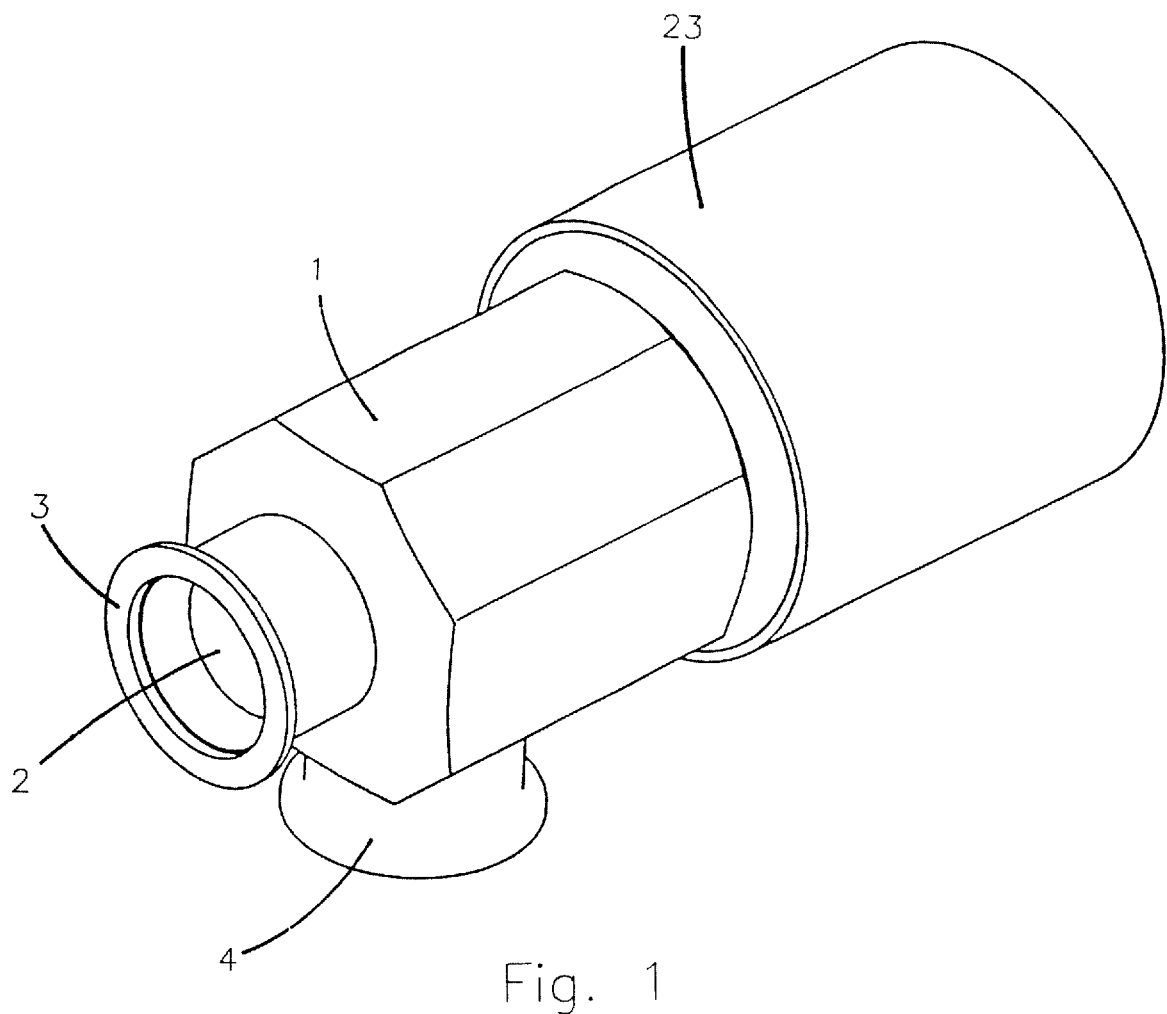
FIG. 1 shows a perspective view of an embodiment example of a vacuum control valve according to the invention.

The vacuum control valve shown in the Figures is constructed in the shape of a corner valve. A valve chamber 1 is provided with connection flanges 3, 4 arranged at an angle to each other. The valve chamber has a valve opening 2 that can be closed to a lesser or greater degree by means of a closing body 5.

The valve opening 2 has a portion with a cylindrical inside wall 6 on which an elastic sealing washer 7, for example made of Viton®, is provided. This can, for example, go with a corresponding ring shaped groove formed on the cylindrical inside wall 6 that receives the sealing washer 7. The sealing washer 7 could also be molded onto the inside wall 6.

The closing body comprises a cylindrical portion 8 with a first end 9 and a second end 10. Adjoining the second end 10 of the cylindrical portion 8, there is a portion that widens conically 11, meaning a portion whose diameter widens continuously starting at the second end 10. Adjoining the portion widening conically 11 there can furthermore be a backstop 12; this is not present in the embodiment example according to FIG. 2, but it can be made out in FIGS. 3 to 5. By coming into contact with the inside wall 13 in the portion of the valve opening that widens and that adjoins the cylindrical inside wall 6, the backstop 12 is used to limit the insertion of the closing body 5. Adjoining the first end 9 of the cylindrical portion, there is a portion that narrows conically 14. This forms an insertion chamfer for inserting the closing body 5 into the sealing washer 7.

Two grooves 15 have been made in the cylindrical portion 8 on sides lying diametrically opposite to each other. The start 16 of the respective groove 15 lies at a distance to the second end 10 of the cylindrical portion 8 and the respective groove stretches to the second end 10 of the cylindrical portion 8. For the shown embodiment example for which a conically narrowing portion 14 is provided adjoining the first end 9, the groove 15 runs on continuously into this portion. The grooves 15 widen (see FIG. 2) and deepen (see FIGS. 3 to 5) along their extent towards the first end 9. Although it is preferred for the respective groove to both widen and deepen along its extent, in principle it is conceivable and feasible to shape the grooves so that they only widen or only deepen. Besides the grooves 15 running axially as shown, in principle grooves 15 running at an angle to the axis are also possible.

Figure 2:
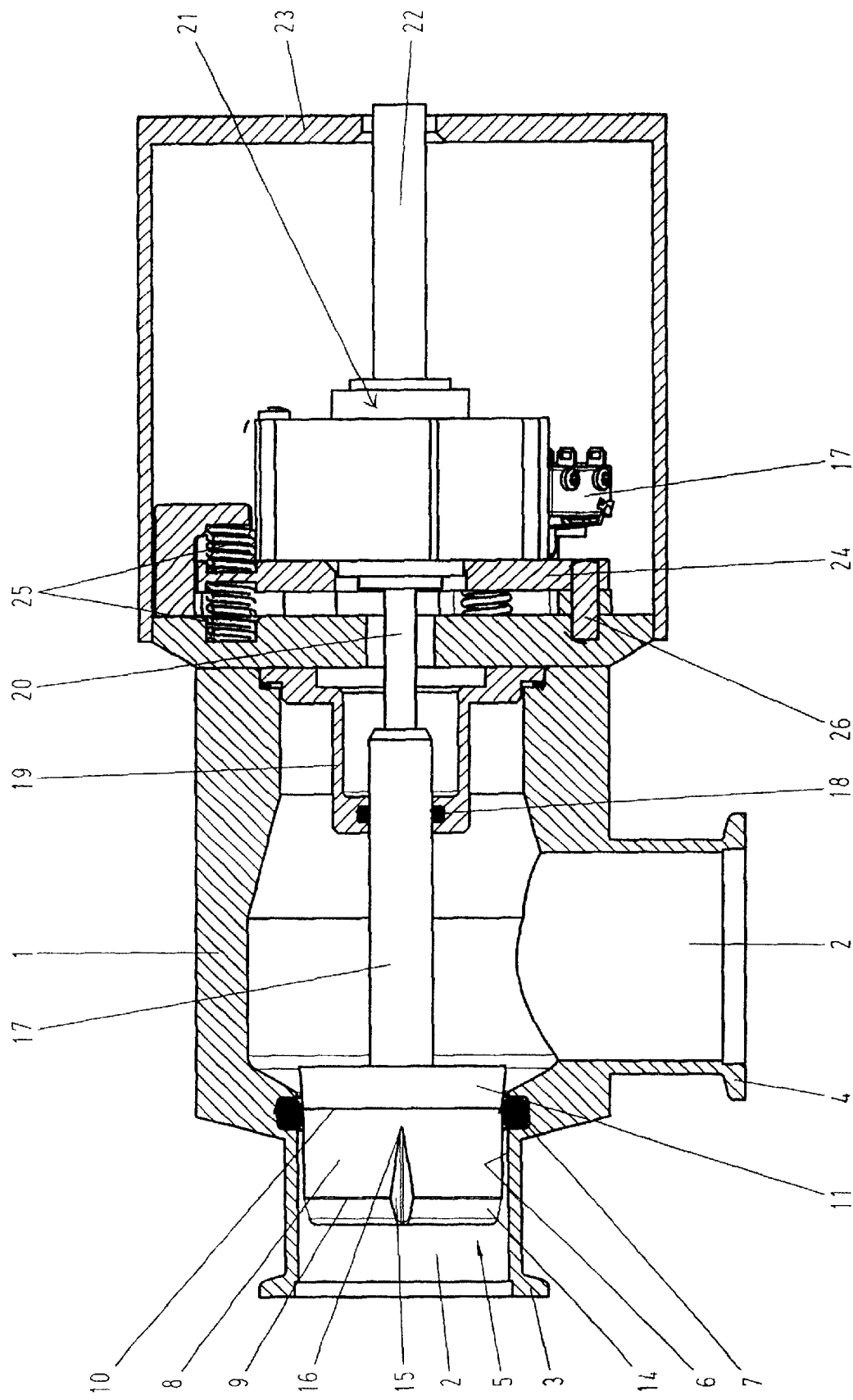
FIG. 2 shows a longitudinal central section through the valve shown in FIG. 1 (closing body not shown in section)

To move the closing body 5 axially, an operating device is provided. Different types of such operating devices which, for example, have drives that can be operated electrically, pneumatically, hydraulically or manually, are known and could be used within the framework of the invention. A preferred operating mechanism shown in FIG. 2 is subsequently to be described only as an example.

The closing body 5 is affixed to a valve rod 17 that passes through a linear feedthrough out of the vacuum area. The linear feedthrough comprises an O-ring 18 that has a guide bush 19 as a bearing. Instead of the shown linear feedthrough, a bellows feedthrough could also be provided. The valve rod 17 is extended by means of a valve stem 20. The valve stem 20 has an outside thread in a portion not visible in FIG. 2 on which a nut with a corresponding inside thread runs driven by a stepper motor 21, wherein the nut is in a bearing that does not permit its movement in an axial direction. On the rear side of the stepper motor 21 covered by a hood 23, the valve stem 20 has a hexagonal cross-section which is contained by a sleeve 22 with a hexagonal inside cross-section attached to the motor so that it can not be rotated; by means of this, the valve stem 20 is secured against rotation.

The stepper motor 21 is mounted on a motor bearing plate 24 which can be moved axially within a certain range; in its resting position it is pre-loaded by spring assemblies. A guiding pin 26 secures the motor bearing plate 24 against rotation. If the motor bearing plate 24 is moved backwards (against the force of the spring assemblies 25), a microswitch permanently mounted on the chamber is actuated to switch off the motor.

Next follows a detailed description of the function of the valve.

Figure 5:
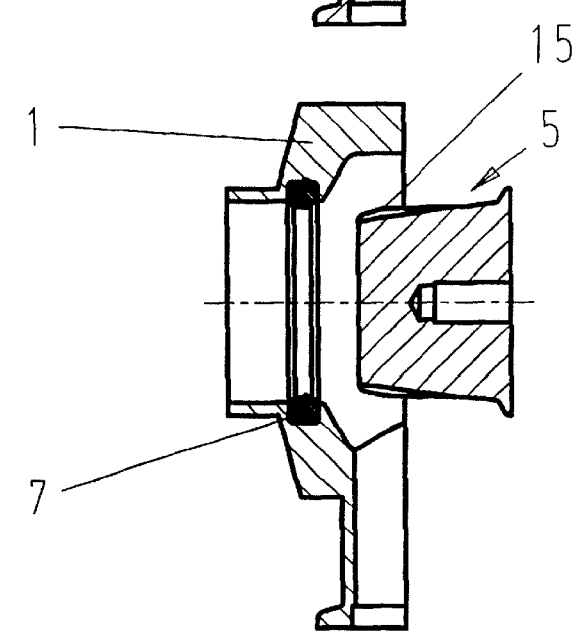

As shown in FIG. 5, the closing body 5 is pulled completely out of the sealing washer 7 in the completely opened state of the valve. In this completely opened state of the valve, the valve has a conductance that corresponds to that of a common corner valve.

Figure 3:
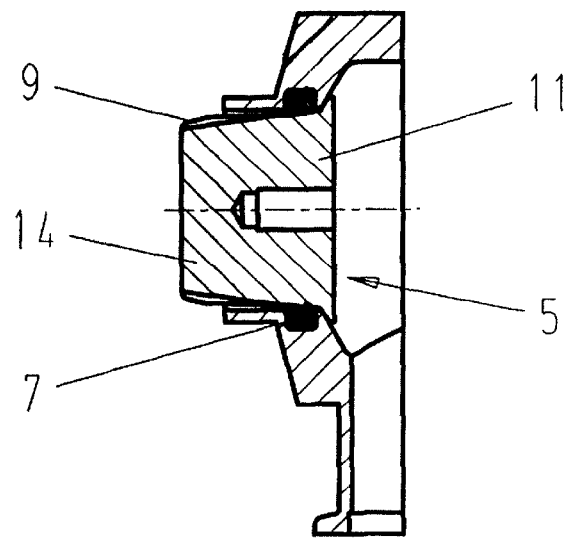
FIGS. 3 to 5 show longitudinal sections of the closing body (in a slightly modified embodiment form), together with the area of the valve chamber in which the sealing washer is located, in the completely closed, partially opened, and completely opened state of the valve.
Figure 4:
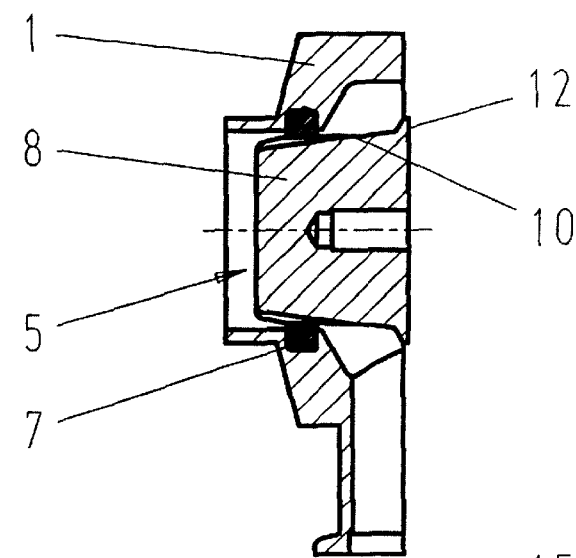

For the purpose of controlling the conductance, the closing body 5 is moved towards the sealing washer 7 and subsequently inserted in it, as can be seen in FIG. 4. Depending on the degree of insertion of the closing body 5, more or less wide or deep sections of the grooves 15 form the essential cross-section of the valve opening (in the portion of the cylindrical portion 8 adjacent to the grooves, the sealing washer 7 is in contact with the closing body so that there is only a very low conductance here). For the position of the closing body 5 shown in FIG. 2 where the sealing washer 7 is in the area between the second end 10 of the cylindrical portion 8 and the start 16 of the groove 15, the valve in all only has a very low conductance. For the complete closing of the valve, the closing body 5 is inserted further so that the sealing washer 7 is pressed by the conically widening portion 11. This position of the valve is shown in FIG. 3. The sealing washer 7 attached to the cylindrical inside wall 6 therefore forms the valve seat. The spring assemblies 25 are used to limit the closing force. When the predetermined closing force has been reached, the microswitch 27 is operated by the moving motor bearing plate 25. The backstop 12 on the rearward end of the closing body 5 can be provided as a safety limit for the maximally possible insertion of the closing body 5 into the portion with the cylindrical inside wall 6.

In the control range where the sealing washer 7 is in the area of the cylindrical portion 8 of the closing body 5, a compensation of production tolerances occurring for the diameters of the cylindrical inside wall 6 and the cylindrical portion 8 is achieved by means of the elasticity of the sealing washer 7. The entire cross-section of the opening of the valve essentially only results from the geometry of the milled grooves 15 and is independent of the production tolerances of these components.

While the foregoing description and drawings represent the present invention, it will be obvious to those skilled in the art that various changes may be made therein without departing from the true spirit and scope of the present invention.

Reference List

1 Valve chamber
2 Valve opening
3 Connection flange
4 Connection flange
5 Closing body
6 Inside wall
7 Sealing washer 8 Cylindrical portion
9 First end
10 Second end
11 Portion
12 Backstop
13 Inside wall
14 Portion
15 Groove
16 Start
17 Valve rod
18 O-ring
19 Guide bush
20 Valve stem
21 Stepper motor
22 Sleeve
23 Hood
24 Motor bearing plate
25 Spring assembly
26 Guide pin
27 Microswitch

What is claimed is:

1. A vacuum control valve comprising:
   a valve chamber with a valve opening which has a portion with a cylindrical inside wall on which an elastic sealing washer is provided;
   a closing body, which comprises a cylindrical portion with a first end and a second end, adjoined by a portion of the closing body that widens into a cone, wherein at least one groove is present in the cylindrical portion of the closing body which extends to the first end of the cylindrical portion and which either widens along its extent to the first end, or deepens, or widens as well as deepens; and
   an operating device for the closing body which comprises a valve rod to which the closing body is attached and a drive device, wherein the closing body can be moved by means of the operating device, from a completely open position of the valve where the closing body has been pulled out of the elastic sealing washer, through a control range where the sealing washer encloses the cylindrical portion of the closing body, to a completely closed position where the portion of the closing body that widens into the cone is pressed against the sealing washer;
   wherein the elastic sealing washer, with the exception of the location or locations at which the one or more grooves are arranged, contacts the closing body in the control area.

2. The vacuum control valve according to claim 1, wherein the at least one groove has a starting point lying at a distance to the second end of the cylindrical portion.

3. The vacuum control valve according to claim 1, wherein the conically widening portion is adjoined by a backstop.

4. The vacuum control valve according to claim 1, wherein the first end of the cylindrical portion is adjoined by a conically narrowing portion which forms an insertion chamfer for the insertion of the closing body into the sealing washer.

5. The vacuum control valve according to claim 1, wherein the groove of which there is at least one essentially follows a course in direction of the axis of the closing body.

6. The vacuum control valve according to claim 1, wherein at least two such grooves have been made in the cylindrical portion.

7. The vacuum control valve according to claim 1, wherein the vacuum control valve is constructed as a corner valve.

8. The vacuum control valve according to claim 1, wherein the valve rod leaves a vacuum area of the valve via a feedthrough.

* * * * *

UNITED STATES PATENT AND TRADEMARK OFFICE
CERTIFICATE OF CORRECTION

PATENT NO. : 6,609,697 B2
DATED : August 26, 2003
INVENTOR(S) : Robert Andreas Gsteu It is certified that error appears in the above-identified patent and that said Letters Patent is hereby corrected as shown below:

<u>Title page,</u>
Please add Item:

-- [73] VAT Holding AG, Haag, SWITZERLAND --

Signed and Sealed this

Twenty-second Day of June, 2004

JON W. DUDAS
*Acting Director of the United States Patent and Trademark Office*